Feb. 9, 1932.  M. BUFFINGTON  1,844,838
COMPOSITE FABRIC AND METHOD AND APPARATUS FOR MAKING THE SAME
Filed Nov. 14, 1929  3 Sheets-Sheet 2

Inventor
MALCOLM BUFFINGTON.

By Fisher and Pedersen
Attorneys

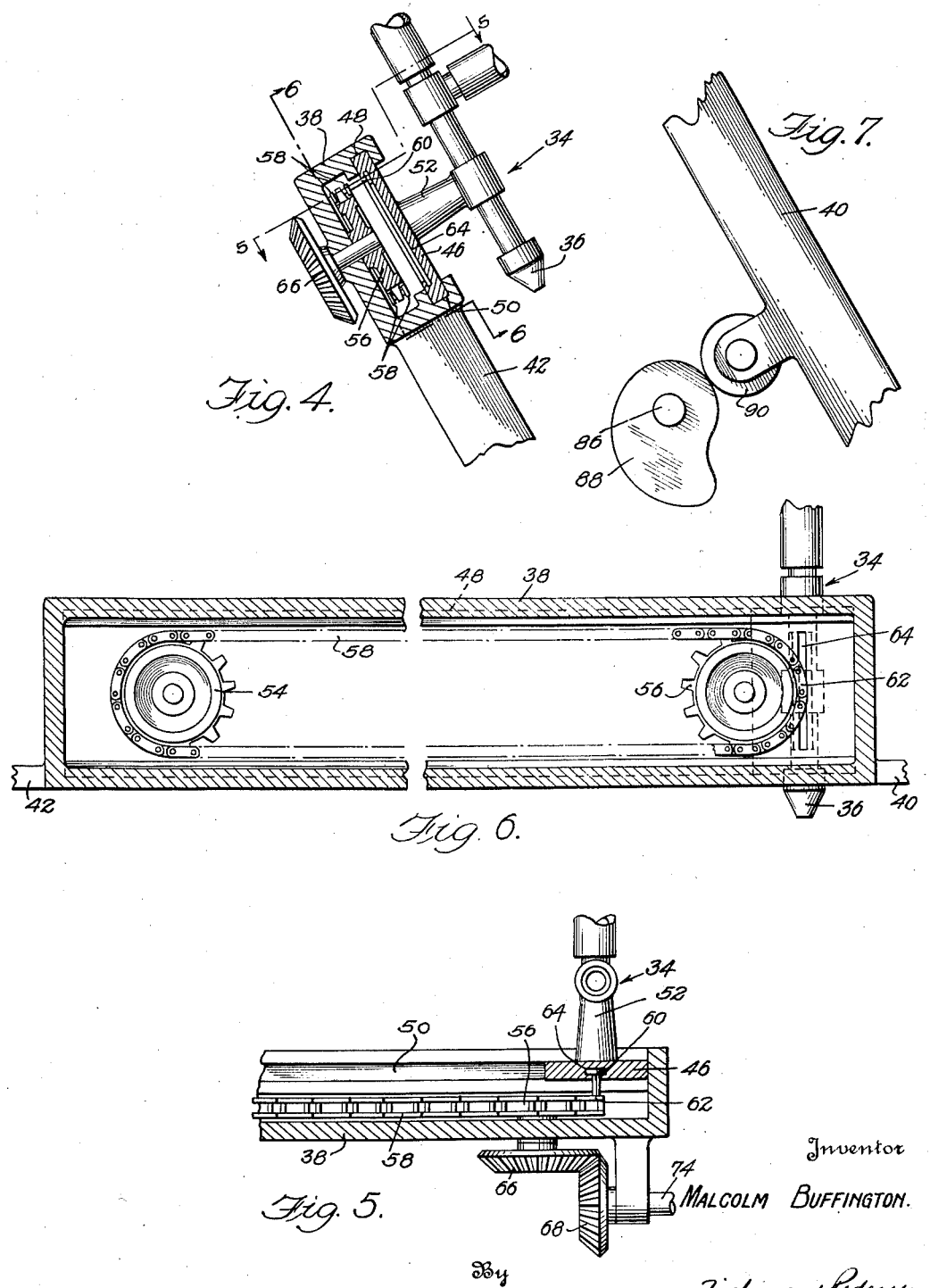

Patented Feb. 9, 1932

1,844,838

UNITED STATES PATENT OFFICE

MALCOLM BUFFINGTON, OF ROSELLE PARK, NEW JERSEY, ASSIGNOR TO LEA FABRICS, INC., OF NEWARK, NEW JERSEY, A CORPORATION OF DELAWARE

COMPOSITE FABRIC AND METHOD AND APPARATUS FOR MAKING THE SAME

Application filed November 14, 1929. Serial No. 407,197.

This invention relates to a laminated or composite fabric and to a method and apparatus for making the same. More particularly the invention relates to a laminated or composite fabric in which yarns or other filaments are arranged in parallel on a fabric backing, comprising preferably a needled fabric to give the requisite body to the laminated sheet fabric. By the use of this backing material, the yarn elements or surface filament material may be readily embossed so as to have the appearance of a woven rug or carpet. The invention further relates to a method and apparatus by which the laminated or composite fabric may be readily made in a manner so as to distribute the yarns or filaments at desired intervals over the surface of the backing without the necessity of having the yarns or filaments contacting or compacted in order to prevent the bonding or cementing material from projecting to the uncoated face of the yarns.

Heretofore a laminated sheet material has been made by cementing cords or threads in parallel to a backing, the cords being so closely compacted as to exclude bonding or cementing material from the opposite face by the compactness of the cords. While this method is applicable to small compact cords or threads, it is not adapted for more loosely woven material, such as yarns, because of the fact that in applying the bonding material upon the exposed surface of the yarns, the tension necessary to hold the yarns compact and to exclude the bonding material from the opposite face, produces a more or less twisting of the yarn, and it is substantially impossible to prevent the bonding material from passing between the yarn elements onto the face which is to be left uncoated. Furthermore, through the mode of application of the bonding material, by means of a spreading device and doctor blade positioned over the surface of a guide roll over which the yarns pass, an excessive amount of cementing material is applied, forming a series of cusps in the channels between the cord elements.

This method of application requires therefore an unnecessarily large amount of rubber material, with the use of yarns, or similar filamenting material, and produces an unsatisfactory product because of penetration of bonding material to face of the material which should be left uncoated.

By the method and apparatus hereinafter described, the use of a large excess of bonding material or cementing material is avoided, and the bonding material is substantially completely excluded from the face of the fabric product to be left uncoated, irrespective of the amount of separation or distribution of the yarns over the backing material; furthermore, the material is employed so as to distribute the cementing material to the portions of the yarn where it is most effective, and in amounts in proportion to the requirements, thereby attaining the greatest economy in the use of the bonding agent.

In the product of my invention, to be hereinafter more fully described, the yarns or filaments are distributed over the backing material to give the desired wear surface, without the use of excessive amounts of yarn, and in a manner so that the wear surface remains uncoated; furthermore, by the use of a backing of needled fabric, in place of burlap or other single fabric backing, the yarn elements may be firmly attached at intervals longitudinally of the yarns to give the appearance of a woven fabric. Moreover, by the use of a yielding material, such as a needled fabric backing, the yarns may be pressed into such intimate contact with the backing that unraveling of the yarns during wear on the yarn surface will be substantially prevented, and during the wear of the material the product retains the appearance of a woven fabric. It will be apparent also that the needled pile fabric material serves as a cushioning medium and gives body to the product so that less wear on the yarn surface takes place during use.

Among the objects of the invention are to provide a laminated or composite fabric which is attractive in appearance and which may be made in a manner to resemble the Brussels or tapestry type of woven rugs and carpets. Other objects of the invention are to provide a rug or carpet material particularly adapted for use in automobiles and for similar purposes requiring a material of low cost and having a substantial body to give the desired amount of cushioning action. Further objects of the invention are to provide a new and improved method and apparatus by which yarns or other filament material may be utilized in the making of the product of my invention in a manner to avoid coating the face of the yarns which is to form the wear surface of the product.

With these and other objects in view, the invention comprises the various features hereinafter more fully described and particularly defined in the claims.

The various features of my invention are illustrated in the accompanying drawings, showing the preferred form of my invention, in which:

Fig. 3 is a detailed sectional view of a portion of the drum showing the yarns or filaments in place in the circumferential grooves on the drum surface by means of which the face of the yarns which is to form the wear surface of the product is protected during the coating operation;

Fig. 4 is a detailed view, partly in section, showing a spray nozzle and associated actuating means by which bonding material may be applied to the surface of the yarns;

Fig. 5 is a detailed sectional view of a portion of the operating mechanism of the spray device taken on the section line 5—5 of Fig. 4 in the direction of the arrows;

Fig. 6 is a detailed sectional view of the mechanism for moving the spraying device crosswise, or along the element of the drum, the view being taken on the line 6—6 of Fig. 4, a portion of the section being shown broken out;

Fig. 7 is an enlarged detail view of the cam and associated roller serving to move the spraying device circumferentially of the drum during the spraying operation;

Fig. 8 is a plan view taken on the section line 8—8 of Fig. 1, showing the embossing elements in the vulcanizing press by means of which the yarn surface is indented at intervals or given a woven appearance;

Figure 1:
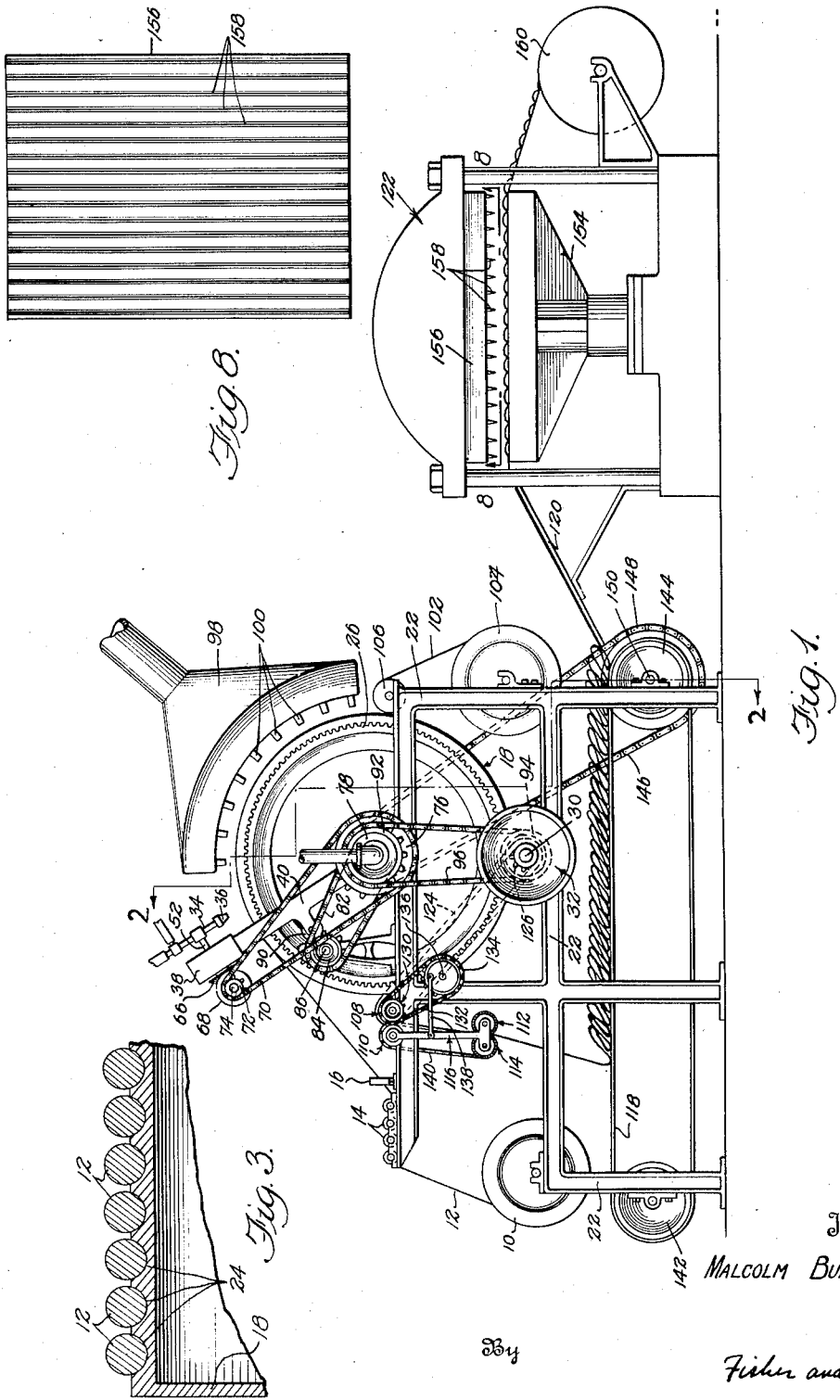
Fig. 1 is a view in side elevation of a form of apparatus particularly adapted for the making of my laminated fabric product.

Referring more particularly to the drawings, the numeral 10 indicates a beam or other suitable source of supply from which yarns or other filamentary elements 12 may be drawn. The filaments are preferably passed through a series of tension bars 14, which may be arranged in a well-known manner to obtain any desired amount of tensioning action upon the yarns or other filaments passed therethrough. From the tension bars the yarn elements are preferably passed through a reed 16 into a series of grooves 24 in the surface of a cylinder or drum 18, the yarns or filaments passing into the grooves in the manner shown more particularly in Fig. 3 of the drawings. The grooves 24 are preferably substantially semi-circular in section although it is to be understood that the grooves may be of any suitable form, such as square or elliptical, for example, or any other suitable form adapted for retaining the yarns or filament materials in place in passing over the surfaces of the drum. By this means, the yarns are prevented from turning or twisting in passing over the surface of the cylinder and during the application of the bonding or cementing material as will be hereinafter described. By this means also, the yarns may be rigidly held at uniform distances apart so as to distribute the yarn in the desired ratio or relationship over the surface of the backing material; and the portion of the yarns or filaments which are protected by the grooves remains uncoated. The drum 18 is preferably hollow and adapted to be heated by steam or other heating medium through the journals 20 and 21, which are preferably provided with the usual stuffing boxes or glands, the drum being supported on a shaft 19 in any suitable way, such as by cast iron channel frames 22. The drum 18 is preferably uniformly rotated by means of a large spur gear 26 which meshes with a pinion 28 carried by a shaft 30 on which is a drive pulley 32, by means of which the drum and actuating mechanism associated therewith may be driven through a belt drive from any suitable source of power.

In order to apply a cementing medium or bonding material to the yarns or filament material 12 while they are held in position in the grooves on the drum, a spray device 34 operated so as to move across the surface of the drum in a path which is retraced at intervals so as to completely coat the exposed surface of the yarn or filament material, is preferably employed. The spray device is preferably operated by suitable mechanism so as to move across the surface of the drum in a path so as to trace or follow an element of the cylindrical surface during the rotation of the drum. By this movement the spray device actually moves back and forth in a helical path over the drum surface, the pitch of the helix being substantially the width of the path made by the spray.

The rubberizing or spray device 34, which is provided with a spray nozzle 36, is preferably mounted upon a channel section 38 carried by two arms 40, 42, which are journalled on the shaft 19 of the drum, the spray device being preferably carried by a plate 46 sliding in grooves 48 and 50 in the channel section, the spray device being mounted on the plate by means of an arm or bracket 52, as shown more particularly in Fig. 4 of the drawings. At opposite ends of the channel section 38 are sprockets 54 and 56 upon which a driving chain 58 is mounted, and by means of which the plate is reciprocated in the grooves 48 and 50, the plate being operated by means of a lug 60 carried by one of the links 62 of the chain 58. The lug member preferably slides in a T-shaped groove 64 (see Fig. 5), the slot extending vertically across the plate 46, as shown more particularly in Figs. 4 and 6.

In order to operate the chain 58, one of the sprockets 56, is preferably driven by means of beveled gears 66 and 68, the gear 68 being mounted on a shaft 74 on which is also mounted a sprocket 72 driven through a chain 70 by means of a sprocket 76. The sprocket 76 is preferably keyed on a bushing 78 adapted to turn freely on the main shaft 19 of the drum.

The mechanism thus far described operates to move the spray nozzle transversely or forward and back across the drum; and in order to produce movement of the spray device circumferentially of the drum while it is rotated, a separate mechanism is employed to produce a movement which when compounded with the transverse movement results in tracing a helical path in space, thus following or moving across the elements of the drum surface. For this purpose a sprocket 80 is carried on the bushing 78 and is connected by means of a chain 82 with a sprocket 84 on a counter-shaft 86, on which is mounted a spiral cam member 88 adapted to engage a roller 90 mounted on one or both of the arms 40, 42, as shown more particularly in Fig. 7, by which the swinging or circumferential movement of the spraying device is accomplished.

It will be understood that the sizes and gear ratios of the various sprockets employed in operating the rubberizing mechanism are so chosen that the rubberizing carriage makes one traverse of the face of the drum in one cycle of the cam member 88, and that the rubberizing mechanism moves circumferentially at the same speed as that of the drum. It will thus be apparent that the spiral cam will be operated so as to impart motion to the rubberizing device tangentially of the drum, along the required path while the rubberizing device travels from one side to the other of the drum.

In order to rotate the bushing member 78 on which the sprocket 80 is mounted, a chain drive 96 is preferably employed connecting the sprocket 92 with the sprocket 94 mounted on the drive shaft 30.

It will be evident by reference to Fig. 3 that as the spray from the nozzle travels over the yarns 12 positioned in the grooves on the drum, only the portion of the yarn surface exposed to the spray will be coated, and the amount of rubberizing material deposited on the yarns or filament material will be greatest at the uppermost part of the yarn, and will decrease in a trigonometrical ratio with the angular distance from the uppermost part of the yarn, it being apparent with reference to Fig. 3, that portions of the yarn below the horizontal diameter of the yarn will not be in line with the spray, and that the portions of the surface of the yarn adjacent the horizontal diameter will receive the least amount of spray. By the application of the cementing or bonding medium in the manner described, the greatest amount of bonding medium is applied to that portion of the yarn which is to be directly attached to the backing, whereas, if the bonding medium were applied by means of a roller or brush, the main body of the cementing material would accumulate between the yarns in cusps, and a comparatively small proportion of the cementing material would be effective or utilized for cementing the yarn or filament elements to the backing.

The cement material may be applied either in the form of an aqueous rubber dispersion or as a rubber solution in a suitable solvent, such as benzol, for example. If desired, a rubber composition containing ammonium carbonate or other suitable ingredient for the making of sponge rubber may be employed for the cementing or bonding medium.

When the cementing material has been applied to the yarns or filamentary material, a considerable amount of the solvent or dispersing medium will be volatilized by the heat of the drum. In order to dry the bonding medium to the desired extent, however, air is preferably passed onto the surface of the coated yarns by means of a blower 98, the air being passed thereto through minute orifices 100 in the usual manner for drying.

The backing material 102 to be applied to the yarns is preferably passed onto the surface of the drum from a supply roller 104 being guided over a roller 106 into contact with the yarns. The backing may be applied by pressure contact with the yarns in any suitable manner, as by means of the roller 106, for example, or a series of rollers, not shown, might be employed for this purpose.

The backing material employed is preferably a needled or punched pile fabric of the form in which pile element material has been needled through a burlap backing. This needled or punched fabric, as ordinarily made, has the fibers or pile element material anchored to the base fabric by means of a rubber cement material, but for the purpose of this invention, the pile element material need not be anchored to the burlap or fabric backing. A material is preferably employed in which the fibers have been needled through the backing without anchoring by means of a bonding material, whereby in attaching the yarns by means of cement material to the needled fabric backing, the cement or bonding material serves the double purpose of anchoring the fibers in the burlap or fabric backing and also to attach the yarns or filament material to the needled fabric. The backing material which is employed, such as the needled fabric, may be coated if desired just before it passes over the roller 106, or, if desired, the backing may have been previously coated, dried and rolled before being employed as a backing for the yarn material as above described.

Figure 2:
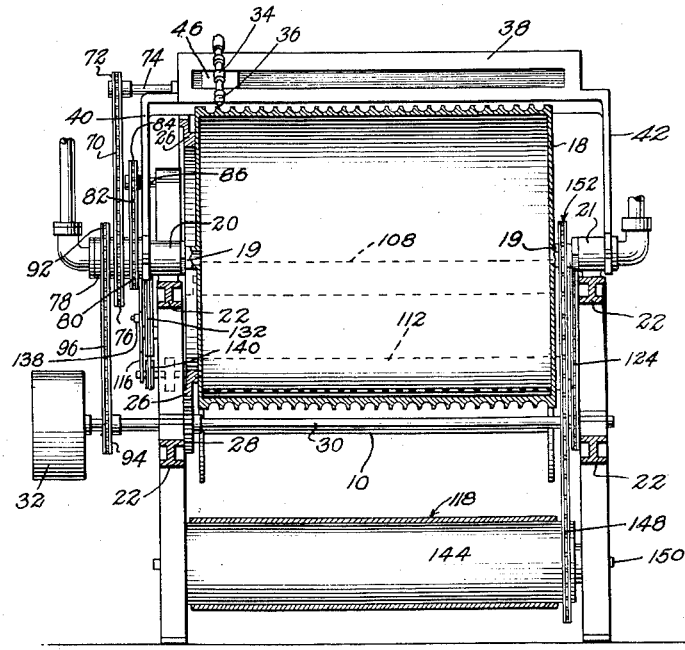
Fig. 2 is a sectional view in elevation taken on the line 2—2 of Fig. 1, in the direction of the arrows.
Figure 9:
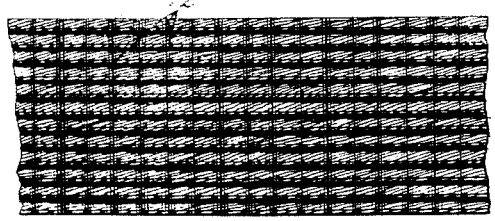
Fig. 9 is a top plan view showing a section of the product of my invention in which yarns or filaments are cemented to a needled fabric and reinforced by means of burlap or other fabric backing.
Figure 12:
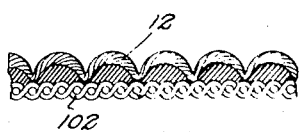
Fig. 12 is a sectional view of a product which may be made by the apparatus shown, in which the yarns are cemented directly to a single backing of burlap or other fabric backing.
Figure 10:
Fig. 10 is a sectional view of the product shown in Fig. 9.
Figure 13:
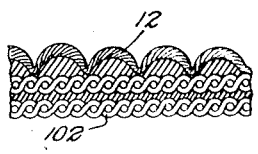
Fig. 13 is a view of a product similar to that shown in Fig. 12 in which a double backing of burlap or other fabric material is used.
Figure 11:
Fig. 11 is a view similar to Fig. 10 of an intermediate form of the product of my invention in which the fabric backing is omitted, the yarn or filament elements being cemented in wave-like sections directly to a punched or needled fabric.

After passing around the lower part of the drum to a roller 108, indicated in dotted lines in Fig. 2, the fabric and attached yarns pass over this roller and through a lapper or folder by means of which the cemented or united product is passed onto a conveyor 118, by which it is carried in lapped or folded position through a tray or chute 120, from which the material passes to a vulcanizing press 122.

The lapper or folder 116 may be constructed and operated in any suitable manner, although it preferably comprises rollers 108 and 110, which are inter-connected by gears, and movable guide rollers 112 and 114, which are mounted on swinging arms 116, the rollers 112 and 114 being also connected by gears so as to be positively actuated. The material drawn from the drum passes downwardly between the stationary rollers 108 and 110 and then between the swinging rollers 112, 114, the lapper being driven by means of a chain 124 which passes over a sprocket 126 on the drive shaft 30 and over a sprocket at the rear of the journal 21 in Fig. 2, or back of the sprocket 130, as seen in Fig. 1.

The sprocket 130 is connected by means of a chain 132 to a sprocket 134, mounted on a shaft 136 carrying two crank disks which are connected by means of connecting rods 138 with the swinging arms 116 of the folder.

The lower rollers 112 and 114 are interconnected by gears, as above stated, and are preferably driven from the upper stationary roller 110 by means of a belt 140 connecting the rollers 110 and 114, as shown more particularly in Fig. 1.

The conveyor 118 comprises a belt which is mounted on rollers 142 and 144, the conveyor moving in a clock-wise direction to transport the folded product to the table or chute 120, from which it passes to the vulcanizing press 122, as above described. In order to drive the conveyor, a chain drive 146 is preferably used, the chain 146 engaging a sprocket 148 on the shaft 150 on which the roller 144 is mounted, and passing over a sprocket 152 mounted on the shaft 19 of the drum or cylinder. Any suitable gear ratio may be employed between the sprockets 152 and 148 so as to obtain the desired speed of travel of the conveyor belt.

The material passing on to the table or chute 120 is fed intermittently into the vulcanizing press 122, the material being maintained in the press a suitable length of time to attain vulcanization. The vulcanizing press may be heated in any suitable manner as will be apparent to those skilled in the art, and any desired degree of pressure may be applied to the movable member 154 to provide the desired degree of pressure.

The upper member 156 of the vulcanizing press preferably contains a series of plates or raised edges 158 arranged at the desired intervals so as to locally apply a high degree of pressure to the fabric material being treated.

During the vulcanizing action the plates 156 are pressed into intimate contact with the yarn surface so that the rubber material penetrates the yarns at the points of greatest pressure applied by the plates, which serves to prevent unravelling of the yarns when wear occurs on the yarn surface when it is in use. During the vulcanizing action, the plates 158 may act to bodily transfer portions of the rubber bonding material from under the yarns directly under the knives or plates to the spaces between them, so as to form locally small bodies of reinforcing material which assist in maintaining the loop or woven appearance of the surface of the yarn product. The amount of rubber cementing material employed, however, should not be sufficient to force the composition into the spaces between parallel strands or yarns. After the material has been subjected to heat and pressure for the desired time to bring about the proper degree of vulcanization, the vulcanized portion is transported to a roller 160 which is preferably automatically operated to take up the material as it is released from the press 122.

It is to be understood that while a substantially continuous operation of the apparatus is preferred, as shown more particularly in Fig. 1 of the drawings, the material may be fed in sections from the conveyor to separate vulcanizing presses. For example, the material may be cut in fifty foot lengths and these lengths passed first to one and then to the other of the vulcanizing presses so as to finish the material at a greater speed.

While the invention has been disclosed in its preferred embodiment, it is to be understood that various changes or modifications may be made in the method and apparatus as disclosed, without departing from the spirit or scope of the invention as defined in the claims.

Having thus described the invention, what is claimed as new is:

1. A composite fabric comprising a layer of parallel strands arranged on a needled pile fabric backing, and cemented thereto by means of a bonding material anchoring the strands to the backing and attaching the needled fibres in place.

2. A composite fabric comprising a layer of parallel strands arranged in non-contiguous relation upon a textile backing having loose fibres needled therethrough, the said strands being permanently attached to the backing by means of vulcanized rubber cement holding the strands in place and also anchoring the said fibres to the said backing.

3. A composite fabric comprising parallel strands arranged in non-contiguous relation upon a needled pile fabric backing and cemented thereto by means of vulcanized cement with portions depressed longitudinally of the strands so that the surface of the product resembles a woven fabric, the bonding material serving the double purpose of anchoring the fibres in place and attaching the strands to the needled pile fabric backing.

4. A composite fabric having the appearance of a tapestry type of woven carpet comprising a single layer of parallel yarns distributed in non-contacting relation over the surface of a needled pile fabric and permanently attached thereto by means of vulcanized rubber cement material anchoring the yarns in place on the needled pile fabric and holding the needled fibres in place, the rubber cement material being distributed mainly on the portion of the yarns contacting with the needled pile fabric.

5. A composite fabric comprising yarn material laid in parallel non-contiguous relation upon the surface of a textile backing material and cemented thereto in a series of depressed portions longitudinally of the yarns by means of sponge rubber, the said rubber penetrating the yarns at the said depressed portions to prevent unravelling of the yarns during wear of the product, the said material having supporting bodies of sponge rubber under the yarns between the said depressed portions, thereby having the appearance of a woven rug or carpet.

6. A composite fabric comprising yarns laid in parallel non-contiguous relation upon the surface of a textile backing having loose fibres needled therethrough, the said yarns being permanently attached to the said textile backing by means of vulcanized sponge rubber cement holding the yarns in place and also anchoring the said fibres to the said backing, the said yarns being sharply depressed into the said backing at regular intervals longitudinally of the yarns to form a surface having the appearance of being woven and to prevent unravelling of the yarns during wear, the said material being reinforced by means of a fabric on the face opposite to that to which the yarns are attached, whereby the needled fabric serves as a cushioning medium between the yarns and the said fabric.

7. A composite fabric having the appearance of the tapestry type of woven fabric, comprising a single layer of uncoated parallel non-contiguous yarns permanently attached to a needled fabric by means of rubber cement, and having a textile backing to reinforce the product, the said needled fabric serving as a cushioning medium for the tread surface and to give the desired body to the product.

8. A method of making a composite fabric which comprises passing a layer of parallel strands onto a needled pile fabric backing and cementing the strands to the backing by means of bonding material serving also to attach the needled fibres in place and leaving the exposed surface of the strands uncoated.

9. A method of making a composite fabric which comprises arranging a series of yarns in parallel, spraying a rubber cement material onto one face of the yarns, passing the coated face of the yarns into contact with a backing material without twisting of the yarns and permanently attaching the yarns to the said backing.

10. A method of making a composite fabric which comprises arranging a series of strands in parallel, non-contiguous, relatively-fixed relation, spraying a thin layer of bonding material onto one face of the said strands, and permanently attaching a textile backing to the coated face of the said strands.

11. A method of making a composite fabric which comprises arranging a series of strands in parallel, non-contiguous, relatively-fixed relation, spraying a thin layer of bonding material onto one face of the said strands, coating a textile backing material having fibres needled therethrough with a bonding material, and permanently attaching the backing material to the coated face of said strands.

12. A method of making a composite fabric which comprises arranging a series of yarns in parallel to form a single layer of yarns, maintaining the yarns in relatively-fixed position to prevent twisting thereof, coating one face of the yarns with a cement material while the yarns are held in the said position, and applying a textile backing member to the coated face of the yarns while rigidly held in relatively-fixed position and permanently attaching the yarns to the said backing.

13. A method of making a composite fabric which comprises attaching a series of strands in parallelism in non-contiguous relation upon the surface of a textile backing by means of a vulcanizable rubber cement, applying pressure to the said strands at regular intervals longitudinally of the strands, and vulcanizing the said rubber cement while the strands are held in pressure contact, thus forming a series of depressions giving the product the appearance of a woven fabric.

14. A method of making a composite fabric which comprises arranging a series of strands in parallel, non-contiguous relation, rigidly retaining the strands in place to protect substantially one-half of the circumference of the strands during application of a cementing material, spraying a vulcanizable cement material on the exposed face of the said strands, and applying a textile backing material to the coated face of the strands while rigidly held in place.

15. A method of making a composite fabric which comprises arranging a series of strands in parallel, non-contiguous relation, rigidly retaining the strands in place to protect substantially one-half of the circumference of the strands during application of a cementing material, spraying a vulcanizable cement material on the exposed face of the said strands, applying a needled fabric backing material to the coated face of the strands while rigidly held in place, applying pressure transversely of the strands at a series of intervals longitudinally thereof, and vulcanizing the cement material while the said pressure is retained, thereby forming a product simulating a woven fabric.

16. A method of making a composite fabric which comprises passing a series of strands into a series of non-contiguous grooves to rigidly hold the strands in place, coating the exposed surface of the strands with a vulcanizable cement material while the said strands are held in place by the grooves, passing a fabric backing member into contact with the coated surface of the strands, and uniting the said strands with the said backing member.

17. A method of making a composite fabric which comprises passing a series of yarns into a corresponding series of parallel, non-contiguous grooves to rigidly hold the yarns in place, coating the exposed surface of the yarns with a vulcanizable cement material while the said yarns are held in place by the grooves, passing a fabric backing member into contact with the coated surface of the yarns, and uniting the said yarns with the said backing member by means of pressure contact applied transversely of the yarns at intervals longitudinally thereof to obtain a series of depressed portions giving the material the appearance of a woven fabric.

18. A method of manufacturing a composite fabric which comprises passing a series of strands in parallel, non-contiguous relation over a revolving drum having a series of grooves in the surface thereof, each of said strands passing into one of the grooves so as to be rigidly held thereby and to prevent twisting of the strands during the coating operation, spraying the exposed surface of the strands with a rubber cement material to distribute the same over the surface of the strands in proportion to the amount of adhesion desired at the corresponding portion of the strand and permanently attaching a fabric backing member to the said strands.

19. A method of making a composite fabric which comprises passing a series of yarns into a corresponding series of grooves arranged circumferentially in parallel upon a cylindrical surface, whereby the yarns will be rigidly held and prevented from twisting in passing over the said cylindrical surface, coating the exposed surface of the yarns with a vulcanizable cement material by means of a spray passing transversely over the yarns and circumferentially over the drum so as to substantially follow an element of the cylindrical surface during the rotation of the cylinder, passing a fabric backing into contact with the coated surface of the yarns, thereafter passing the combined yarn and backing member into a vulcanizing press to permanently attach the yarns to the said backing and applying pressure to form a series of depressed portions transversely of the yarns at a series of regular intervals longitudinally of the yarns to give the appearance of a woven fabric and to impregnate the said depressed portions so as to prevent unravelling of the yarns during wear.

20. A method of manufacturing a composite fabric which comprises passing a series of yarns through a tensioning member onto the surface of a cylindrical heated drum, the said drum having a series of parallel grooves circumferentially thereof and lying non-adjacent so as to distribute the yarns over the surface without contacting and to give the desired distribution, applying a rubber vulcanizable cement material to the exposed surfaces of the yarns, so that the amount thereon will decrease from the top portion of the yarns to the side portions thereof adjacent to the said grooves, applying air to the coated portions of the yarns to expel the volatile portions of the cementing material, passing a fabric backing into contact with the drum over the coated surface of the said yarns, applying pressure to cause adherence of the yarns to the said backing, withdrawing the combined yarn and fabric from the drum, folding the said combined yarn and fabric on the surface of a conveyor by means of a folder, passing the folded material into a vulcanizing press adapted to form a series of depressions transversely of the said yarns and arranged at intervals longitudinally of the yarns and vulcanizing the said cement material to permanently attach the said yarns to the said backing.

21. A method of manufacturing a composite fabric which comprises arranging a series of yarns under tension in parallel and non-contacting relation, passing the said yarns into a corresponding series of grooves in the surface of a cylindrical heated drum, rotating the said drum, spraying a vulcanizable rubber cement material during the rotation of the drum onto the exposed surface of the yarns while rigidly held in the said grooves to prevent twisting thereof, applying a needled fabric base having a vulcanizable rubber cement composition on one face thereof to the coated portions of the said yarns, withdrawing the product from the cylindrical drum and vulcanizing said rubber cement material to permanently attach the said yarns to the said backing.

22. An apparatus of the kind described comprising a drum having a series of grooves therein, means for passing a series of strands arranged in parallel into the said grooves, means for applying a rubber cement material to the said strands while held in the said grooves and means for applying a backing member to the said strands while rigidly held in the said grooves.

23. An apparatus of the kind described comprising a drum having a series of circumferential grooves in the surface thereof, means for passing a series of strands into the said grooves to be rigidly held thereby, means for spraying a vulcanizable rubber cement material onto the exposed surface of the said strands, means for passing a textile backing material into contact with the coated portion of the strands while rigidly held in the said grooves, a vulcanizing press having a series of plates therein adapted to form a series of depressed portions in the strands transversely and at regular intervals longitudinally thereof, and means for passing the combined product into the said press for vulcanization thereof and to form a product simulating a woven fabric.

24. An apparatus of the kind described comprising a drum having a series of parallel circumferential grooves in the surface thereof, means for passing a series of strands under tension into the said grooves to be rigidly held thereby and to protect substantially one-half the circumference of the said strands, means for spraying a vulcanizable rubber cement material onto the exposed surface of the said strands, means for passing a needled fabric backing material into contact with the coated portion of the strands while rigidly held in the said grooves, a vulcanizing press having a series of plates therein adapted to form a series of depressed portions in the strands transversely and at regular intervals longitudinally thereof, and means for passing the combined product into the said press for vulcanization thereof and to form a product simulating a woven fabric.

25. An apparatus of the kind described comprising a cylindrical drum having a series of circular grooves arranged circumferentially of the said drum and at uniform distances apart to prevent contact of the yarns in the grooves with each other, means for uniformly rotating the said drum, a spray device for spraying a vulcanizable cement over the exposed surface of the said yarns, means cooperating with the said means for rotating the drum for moving the spray device transversely over the surface of the drum and simultaneously circumferentially thereof so as to obtain movement following an element of the drum surface while the drum is rotated, means for applying a backing material to the coated portions of the said yarns, means operatively connected with the drive mechanism for the drum to withdraw the product from the drum and to fold the material, a belt conveyor operatively connected with the said drum to transfer the product fed thereto and means for vulcanizing the said rubber cement material to permanently attach said yarns to the said backing.

In testimony whereof I have affixed my signature.

MALCOLM BUFFINGTON.